(12) United States Patent
Yamada et al.

(10) Patent No.: US 8,344,037 B2
(45) Date of Patent: Jan. 1, 2013

(54) RESIN COMPOSITION FOR CROSS-LINKED FOAM MOLDING, CROSS-LINKED FOAM MOLDED ARTICLE, AND METHOD FOR PRODUCTION OF CROSS-LINKED FOAM MOLDED ARTICLE

(75) Inventors: Katsuhiro Yamada, Chiba (JP); Yoshinobu Nozue, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/060,770

(22) PCT Filed: Aug. 27, 2009

(86) PCT No.: PCT/JP2009/065377
§ 371 (c)(1),
(2), (4) Date: Feb. 25, 2011

(87) PCT Pub. No.: WO2010/024458
PCT Pub. Date: Mar. 4, 2010

(65) Prior Publication Data
US 2011/0160324 A1 Jun. 30, 2011

(30) Foreign Application Priority Data
Aug. 29, 2008 (JP) ................................. 2008-221083

(51) Int. Cl.
*C08J 9/04* (2006.01)
(52) U.S. Cl. ........ 521/134; 521/142; 521/143; 521/144; 264/54; 525/230; 525/242
(58) Field of Classification Search .................. 521/134, 521/140, 142, 143, 144; 264/54; 525/240, 525/242
See application file for complete search history.

(56) References Cited

U.S. PATENT DOCUMENTS

| | | | |
|---|---|---|---|
| 5,093,381 A | 3/1992 | Yamamoto et al. | |
| 6,329,465 B1 * | 12/2001 | Takahashi et al. | ............. 525/191 |
| 6,462,136 B1 * | 10/2002 | Saito et al. | ..................... 525/240 |
| 2006/0210804 A1 | 9/2006 | Yamada et al. | |
| 2010/0216947 A1 | 8/2010 | Nozue et al. | |

FOREIGN PATENT DOCUMENTS

| | | |
|---|---|---|
| JP | 2000-143858 A | 5/2000 |
| JP | 2000-143866 A | 5/2000 |
| JP | 2000-154271 A | 6/2000 |
| JP | 2001-146530 A | 5/2001 |
| JP | 2004-217755 A | 8/2004 |
| JP | 2005-314638 A | 10/2005 |
| JP | 2005-314641 A | 11/2005 |
| WO | WO 2008/143306 A1 | 11/2008 |

OTHER PUBLICATIONS

International Search Report, dated Sep. 16, 2009, corresponding with International Application No. PCT/JP2009/065377 (English).

* cited by examiner

*Primary Examiner* — Irina S Zemel
(74) *Attorney, Agent, or Firm* — Fitch, Even, Tabin & Flannery, LLP

(57) ABSTRACT

A resin composition for cross-linking foam molding having a polymer composition which comprises 100 parts by weight of the following component (A) and 0.5 to 20 parts by weight of the following component (B); a foaming agent; and a cross-linking agent, wherein the component (A) is an ethylene-based polymer satisfying the following conditions (a1) to (a2): (a1) the density is 860 to 935 kg/m3, and (a2) the melt flow rate (MFR) is 0.1 to 10 g/10 minutes, and the component (B) is an ethylene-α-olefin copolymer satisfying the following conditions (b1) to (b3): (b1) the density is 890 to 925 kg/m$^3$, (b2) the intrinsic viscosity [η] determined in a tetralin solution is 4 to 15 dL/g, and (b3) the activation energy of flow (Ea) is less than 50 kJ/mol.

7 Claims, No Drawings

RESIN COMPOSITION FOR CROSS-LINKED FOAM MOLDING, CROSS-LINKED FOAM MOLDED ARTICLE, AND METHOD FOR PRODUCTION OF CROSS-LINKED FOAM MOLDED ARTICLE

CROSS-REFERENCE TO RELATED APPLICATIONS

This is a U.S. National Phase of International Application PCT/JP2009/065377, filed Aug. 27, 2009, and claims priority benefits under 35 USC §119 based on Japanese Application 2008-221083 filed Aug. 29, 2008, the entire disclosures of which applications are hereby incorporated herein by reference.

TECHNICAL FIELD

The present invention relates to a resin composition for cross-linking foam molding, a cross-linked foamed molded article, and a method of producing the cross-linked foamed molded article.

BACKGROUND ART

A cross-linked foamed molded article comprising a polyethylene-based resin has been extensively used as convenience goods, floor covering materials, sound insulating materials, heat insulating materials, footwear members (such as an outer sole, a midsole, an inner sole, and the like), and the like. In particular, as the cross-linked foamed molded article, for example, a cross-linked foamed molded article prepared by cross-linking and foaming ethylene-vinyl acetate copolymer is proposed (see, for example, JP-3-2657-B.) In addition, there is proposed a cross-linked foamed molded article which is prepared by cross-linking and foaming an ethylene-α-olefin copolymer which is formed by copolymerizing ethylene and α-olefin using a polymerization catalyst which is formed by contact-treating a co-catalyst carrier formed by a reaction of diethyl zinc, pentafluorophenol, water, silica and hexamethyldisilazane, with a contact-treated matter of triisobutyl aluminum and racemic-ethylenebis(1-indenyl)zirconium diphenoxide [see, for example, JP-2005-314638-A].

When these cross-linked foamed molded articles are used for footwear members such as outer soles, midsoles and inner soles, the cross-linked foamed molded articles are required to have a high fatigue resistance.

DISCLOSURE OF THE INVENTION

The present inventors have extensively studied to solve the above-mentioned problem. As a result, it found that a cross-linked foamed molded article having superior fatigue resistance could be obtained by using a specific resin composition for cross-linking foam molding. Thus, the present invention was accomplished.

That is, the first aspect of the present invention relates to a resin composition for cross-linking foam molding comprising:

a polymer composition which comprises 100 parts by weight of the following component (A) and 0.5 to 20 parts by weight of the following component (B);

a foaming agent; and a cross-linking agent, wherein the component (A) is an ethylene-based polymer satisfying the following conditions (a1) to (a2):

(a1) the density is 860 to 935 kg/m$^3$, and (a2) the melt flow rate (MFR) is 0.1 to 10 g/10 min.

the component (B) is an ethylene-α-olefin copolymer satisfying the following conditions (b1) to (b3):

(b1) the density is 890 to 925 kg/m$^3$, (b2) the intrinsic viscosity [η] determined in a tetralin solution is 4 to 15 dL/g, and (b3) the activation energy of flow (Ea) is less than 50 kJ/mol.

The second aspect of the present invention relates to a method of producing a cross-linked foamed molded article comprising:

filling the resin composition for cross-linking foam molding according to claim 1 into a mold; and heating the resin composition at a temperature which is equal to or higher than the decomposition temperature of the foaming agent and equal to or higher than the decomposition temperature of the cross-linking agent, while pressurizing the resin composition at 50 kg/cm$^2$ or more, thereby cross-linking and foaming the resin composition.

The third aspect of the present invention relates to a cross-linked foamed molded article obtained by the above-mentioned method of producing a cross-linked foamed molded article.

The fourth aspect of the present invention relates to a compressed cross-linked foamed molded article obtained by compressing the above-mentioned cross-linked foamed molded article.

The fifth aspect of the present invention relates to a footwear member of the above-mentioned cross-linked foamed molded article or compressed cross-linked foamed molded article.

The sixth aspect of the present invention relates to a footwear comprising the above-mentioned footwear member.

MODE FOR CARRYING OUT THE INVENTION

As the ethylene-based polymer of the component (A), an ethylene-α-olefin copolymer, high-pressure low-density polyethylene, and the like can be used. In particular, when the cross-linked foamed molded article of the present invention is used as a sole member such as a midsole, an ethylene-α-olefin copolymer is preferred in light of enhancing the strength of the cross-linked foamed molded article.

The ethylene-α-olefin copolymer of the component (A) is a copolymer having a monomeric unit based on ethylene and a monomeric unit based on an α-olefin. The α-olefin can include propylene, 1-butene, 1-pentene, 1-hexene, 1-heptene, 1-octene, 1-nonene, 1-decene, 1-dodecene, 4-methyl-1-pentene, 4-methyl-1-hexene, and the like, which can be used separately or in combination of two or more thereof. The α-olefin is preferably an α-olefin having 3 to 20 carbon atoms, more preferably an α-olefin having 4 to 8 carbon atoms, and still more preferably at least one α-olefin selected from the group consisting of 1-butene, 1-hexene, 1-octene, and 4-methyl-1-pentene.

Examples of ethylene-α-olefin copolymers of the component (A) include ethylene-1-butene copolymers, ethylene-1-hexene copolymers, ethylene-4-methyl-1-pentene copolymers, ethylene-1-octene copolymers, ethylene-1-butene-1-hexene terpolymers, ethylene-1-butene-4-methyl-1-pentene terpolymers, ethylene-1-butene-1-octene terpolymers, and the like. In light of enhancing the strength of the cross-linked foamed molded article, preferred are copolymers having a monomeric unit based on ethylene and a monomeric unit based on an α-olefin having 6 to 8 carbon atoms, which specifically include ethylene-1-hexene copolymers, ethylene-1-octene copolymers, ethylene-1-butene-1-hexene terpolymers, and ethylene-1-butene-1-octene terpolymers.

In the ethylene-α-olefin copolymer of the component (A), the content of the monomeric unit based on ethylene is usually 80 to 98% by weight relative to the whole weight (100% by weight) of the ethylene-α-olefin copolymer, while the content of the monomeric unit based on the α-olefin is usually 2 to 20% by weight relative to the whole weight (100% by weight) of the ethylene-α-olefin copolymer.

The density (in kg/m$^3$) of the ethylene-based copolymer of the component (A) is 860 to 935 kg/m$^3$. In light of enhancing the stiffness of the cross-linked foamed molded article, the density is preferably 865 kg/m$^3$ or more, more preferably 870 kg/m$^3$ or more, still more preferably 900 kg/m$^3$ or more. Furthermore, in light of enhancing the lightweight property of the cross-linked foamed molded article, it is preferably 920 kg/m$^3$ or less. The density is determined in accordance with the immersion method described in JIS K7112-1980, after annealing described in JIS K6760-1995.

The melt flow rate (MFR; in g/10 min.) of the ethylene-based copolymer of the component (A) is 0.1 to 10 g/10 min. Because a foamed molded article having a high expansion ratio can be obtained and foam moldability is enhanced, the MFR is preferably 0.2 g/10 min. or more. Furthermore, because a cross-linked foamed molded article superior in strength can be obtained, the MFR is preferably 8 g/10 min. or less, more preferably 6 g/10 min. or less. The MFR is determined by A-method under the conditions of a temperature of 190° C. and a load of 21.18 N according to HS K7210-1995. In the determination of the melt flow rate, an ethylene-based copolymer, in which an antioxidant has been compounded in an amount of about 1000 ppm is used.

The molecular weight distribution ($M_w/M_n$) of the ethylene-based copolymer of the component (A) is preferably 3 or more, more preferably 5 or more, and still more preferably 6 or more in light of enhancing the shape-processing property. Furthermore, in light of enhancing the impact strength, it is preferably 25 or less, more preferably 20 or less, and still more preferably 15 or less. The molecular weight distribution (Mw/Mn) is a value (Mw/Mn) derived by dividing the weight-average molecular weight (Mw) by the number-average molecular weight (Mn), wherein Mw and Mn are determined according to a gel permeation chromatography (GPC) method. As measuring conditions, for example the following conditions can be enumerated:
  (1) Apparatus: Waters 150 C made by Waters,
  (2) Separating column: TOSOH TSKgelGMH6-HT,
  (3) Measurement temperature: 140° C.,
  (4) Carrier: ortho-dichlorobenzene,
  (5) Flow rate: 1.0 mL/min.,
  (6) Injection rate 500 μL,
  (7) Detector: differential refractometry, and
  (8) Molecular-weight standard reference material: standard polystyrene.

The [η] of the ethylene-based copolymer of the component (A) is preferably smaller than 4. Additionally, the activation energy of flow of the ethylene-based copolymer of the component (A) is preferably 50 kJ/mol or more.

The method of producing the ethylene-α-olefin copolymer of the component (A) may be a method wherein ethylene and an α-olefin are copolymerized with a metallocene catalyst using, as a catalyst component, a metallocene complex having a ligand in which two (substituted) indenyl groups are linked by a bridging group, such as an alkylene group and a silylene group, for example, ethylenebis(1-indenyl)zirconium diphenoxide.

In the metallocene catalyst, a co-catalyst component to activate a metallocene complex is used. Examples of co-catalyst component include an organic aluminum oxy compound, a boron compound, an organic zinc compound, and the like. These co-catalyst components are preferably supported on a particulate carrier for use.

The particulate carrier is preferably a porous material, and inorganic oxides, such as $SiO_2$, $Al_2O_3$, MgO, $ZrO_2$, $TiO_2$, $B_2O_3$, CaO, ZnO, BaO, and $ThO_2$; clays or clay minerals, such as smectite, montmorillonite, hectorite, laponite, and saponite; and an organic polymer, such as polyethylene, polypropylene, styrene-divinylbenzene copolymers, or the like. The 50%-volume mean particle diameter of the particulate carrier is usually in the range of 10 to 500 μm, which is determined according to a light scattering laser diffractometry etc. Furthermore, the pore volume of the particulate carrier is usually 0.3 to 10 mL/g, which is mainly determined according to a gas absorption method (BET method). The specific surface area of the particulate carrier is usually 10 to 1000 m$^2$/g, which is mainly determined according to a gas absorption method (BET method).

The method of producing the ethylene-α-olefin copolymer of the component (A) can in particular suitably include a method wherein ethylene and an α-olefin are copolymerized in the presence of a polymerization catalyst formed by contacting the following co-catalyst carrier (A), a metallocene complex (B) having a ligand in which two (substituted) indenyl groups are linked by a bridging group, such as an alkylene group and a silylene group, and an organic aluminum compound (C) with each other.

The above-mentioned co-catalyst carrier (A) is a carrier obtained by bringing diethyl zinc as a component (a), two types of fluorinated phenols as a component (b), water as a component (c), an inorganic particulate carrier as a component (d), and 1,1,1,3,3,3-hexamethyldisilazane [$((CH_3)_3Si)_2NH$] as a component (e) into contact with each other.

The fluorinated phenol of the component (b) can include pentafluorophenol, 3,5-difluorophenol, 3,4,5-trifluorophenol, 2,4,6-trifluorophenol, and the like. In light of enhancing the activation energy of flow ($E_a$) of the ethylene-α-olefin copolymer of the component (A), it is preferred to use two types of fluorinated phenols having different fluorine numbers. For example, combination such as pentafluorophenol/3,4,5-trifluorophenol, pentafluorophenol/2,4,6-trifluorophenol, and pentafluorophenol/3,5-difluorophenol can be enumerated. A combination of pentafluorophenol/3,4,5-trifluorophenol is preferred. A molar ratio of a fluorinated phenol having a smaller fluorine number to a fluorinated phenol having a larger fluorine number is 20/80 to 80/20.

The inorganic compound particle of the component (d) is preferably silica gel.

The used amount of each of diethyl zinc as the component (a), two types of the fluorinated phenols as the component (b), and water as the component (c) is not particularly limited. When the molar proportions of the used amounts of the components are supposed to be molar proportions of "diethyl zinc as the component (a): two fluorinated phenols as the component (b): water as the component (c)=1:x:y", it is preferred that "x" and "y" satisfy the following formula:

$$|2-x-2y|<1$$

wherein "x" is preferably a number of from 0.01 to 1.99, more preferably a number of from 0.10 to 1.80, still more preferably a number of from 0.20 to 1.50, and most preferably a number of from 0.30 to 1.00.

Furthermore, the amount of the inorganic particulate carrier as the component (d) to be used relative to diethyl zinc as the component (a) is preferably such an amount that the amount of zinc atoms derived from diethyl zinc as the component (a) which is contained in particles resulting from the contact of the diethyl zinc as the component (a) with the inorganic particulate carrier as the component (d), will become 0.1 mmoles or more, and more preferably from 0.5 to 20 mmoles as expressed by the number of moles of zinc atoms contained in 1 g of the resultant particles. The amount of trimethyldisilazane as the component (e) to be used relative to the inorganic particulate carrier as the component (d) is preferably such an such that the amount of trimethyldisilazane as the component (e) relative to 1 g of the inorganic particulate carrier as the component (d) will become 0.1 mmoles or more, and more preferably from 0.5 to 20 mmoles.

One preferred example of the metallocene complex (B) having a ligand in which two (substituted) indenyl groups are linked by a bridging group, such as an alkylene group and a silylene group, is ethylenebis(1-indenyl)zirconium diphenoxide.

Preferred organic aluminum compounds (C) include triisobutylaluminum and trinormaloctylaluminum.

The used amount of the metallocene complex (B) is preferably from $5 \times 10^{-6}$ to $5 \times 10^{-4}$ moles relative to 1 g of the co-catalyst carrier (A). The used amount of the organic aluminum compound (C) is preferably from 1 to 2000 as expressed by the ratio (Al/M) of the number of moles of aluminum atoms of the organic aluminum compound (C) to the number of moles of metal atoms of the metallocene complex (B).

If necessary, the above-mentioned polymerization catalyst formed by bringing the co-catalyst carrier (A), the metallocene complex (B) and the organic aluminum compound (C) into contact with each other may be a polymerization catalyst formed by bringing an electron donative compound (D) into contact with the co-catalyst carrier (A), the metallocene complex (B) and the organic aluminum compound (C). Preferred electron donative compound (D) include triethylamine and trinormaloctylamine.

In light of enhancing the molecular weight distribution of the ethylene-α-olefin copolymer as the component (A), it is preferred to use the electron donative compound (D), the used amount of which is preferably 0.1 mol % or more, and more preferably 1 mol % or more relative to the number of moles of aluminum atoms of the organic aluminum compound (C). In light of enhancing the polymerization activity, the used amount is preferably 10 mol % or less, and more preferably 5 mol % or less.

The method for producing the ethylene-α-olefin copolymer of the component (A) is preferably a method of co-polymerizing ethylene and an α-olefin using, as a catalyst component or a catalyst, a preliminarily polymerized solid component obtained by subjecting a small amount of olefin to polymerization, which is hereinafter referred to as "preliminary polymerization", using a solid catalyst component in which a co-catalyst component is supported on a particulate carrier, for example, a preliminarily polymerized solid component obtained by subjecting a small amount of olefin to polymerization using a co-catalyst carrier, a metallocene complex, and a co-catalyst component (e.g., an alkylating agent, such as an organic aluminum compound).

Examples of the olefin to be used in the preliminary polymerization include ethylene, propylene, 1-butene, 1-pentene, 1-hexene, 1-octene, 4-methyl-1-pentene, cyclopentene, and cyclohexene. These can be used singly or two or more of them can be used in combination. Furthermore, the content of the preliminarily polymerized polymer in the preliminarily polymerized solid component is usually 0.1 to 500 g, and preferably 1 to 200 g per gram of the solid catalyst component.

The preliminary polymerization method may be a continuous polymerization method or a batch polymerization method, and examples thereof include a batch-type slurry polymerization method, a continuous slurry polymerization method, and a continuous gas phase polymerization method. A method of charging catalyst components such as a co-catalyst carrier, a metallocene complex, and other co-catalyst components (e.g., an alkylating agent, such as an organic aluminum compound) into a polymerization reaction vessel for the preliminary polymerization is usually a method of charging the catalyst components using an inert gas, such as nitrogen and argon, hydrogen, ethylene or the like in the absence of water, or a method of dissolving or diluting the components in a solvent and charging them in the state of a solution or slurry. The polymerization temperature in the preliminary polymerization is usually a temperature that is lower than the melting point of the preliminarily polymerized polymer, preferably from 0 to 100° C., and more preferably from 10 to 70° C.

When the preliminary polymerization is carried out by a slurry polymerization method, the solvent may be a hydrocarbon having 20 or less carbon atoms. Examples thereof include saturated aliphatic hydrocarbons such as propane, normal-butane, isobutane, normal-pentane, isopentane, normal-hexane, cyclohexane, heptane, octane, decane, and aromatic hydrocarbons such as benzene, toluene, and xylene, which are used singly or two or more of which are used in combination.

The method for producing the ethylene-α-olefin copolymer of the component (A) is preferably a continuous polymerization method accompanied by the formation of particles of ethylene-α-olefin copolymer, examples of which method include a continuous gas phase polymerization method, a continuous slurry polymerization method, and a continuous bulk polymerization method. A continuous gas phase polymerization method is preferred. A gas phase polymerization reaction apparatus to be used in the polymerization method is usually an apparatus having a fluidized bed type reaction vessel, and preferably an apparatus having a fluidized bed type reaction vessel with an enlarged portion. A stiffing blade may be installed within the reaction vessel.

As the method of feeding a preliminarily polymerized solid component resulting from preliminary polymerization to a continuous polymerization reaction vessel accompanied by the formation of particles of an ethylene-α-olefin copolymer there is usually used a method of feeding the solid component using an inert gas, such as nitrogen and argon, hydrogen, ethylene or the like in the absence of water, or a method of dissolving or diluting the component in a solvent and feeding it in the state of a solution or slurry.

When high-pressure low-density polyethylene is used as the component (A), a resin that is produced by polymerizing ethylene usually under conditions including a polymerization pressure of 100 to 300 MPa and a polymerization temperature of 130 to 300° C. using a radical generator such as an organic peroxide or oxygen as a polymerization initiator, generally by using a vessel type reactor or a tube type reactor can be used as the high-pressure low-density polyethylene.

It is permissible to control the MFR by using hydrogen or a hydrocarbon such as methane and ethane as a molecular weight controlling agent.

The ethylene-α-olefin copolymer of the component (B) is a copolymer comprising a monomeric unit based on ethylene and a monomeric unit based on an α-olefin. Examples of the α-olefin include propylene, 1-butene, 1-pentene, 1-hexene, 1-heptene, 1-octene, 1-nonene, 1-decene, 1-dodecene, 4-methyl-1-pentene, and 4-methyl-1-hexene, and these may be used singly or two or more of them may be used in combination. The α-olefin is preferably an α-olefin having 3 to 20 carbon atoms, more preferably an α-olefin having 4 to 8 carbon atoms, and still more preferably at least one α-olefin selected from among 1-butene, 1-hexene, and 4-methyl-1-pentene.

Examples of ethylene-α-olefin copolymers of the component (B) include ethylene-1-butene copolymers, ethylene-1-hexene copolymers, ethylene-4-methyl-1-pentene copolymers, ethylene-1-octene copolymers, ethylene-1-butene-1-hexene terpolymers, ethylene-1-butene-4-methyl-1-pentene terpolymers, and ethylene-1-butene-1-octene terpolymers. Ethylene-1-butene copolymers, ethylene-1-hexene copolymers, ethylene-4-methyl-1-pentene copolymers, and ethylene-1-butene-1-hexene terpolymers are preferred.

In the ethylene-α-olefin copolymer of the component (B), the content of the monomeric unit based on ethylene is usually 50 to 99.5% by weight and preferably 80 to 99% by weight relative to the whole weight (100% by weight) of the ethylene-α-olefin copolymer. The content of the monomeric unit based on the α-olefin is usually 0.5 to 50% by weight, and preferably 1 to 20% by weight relative to the whole weight (100% by weight) of the ethylene copolymer.

The density (in kg/m$^3$) of the ethylene-α-olefin copolymer of the component (B) is 890 to 925 kg/m$^3$. In light of enhancing the stiffness of a cross-linked foamed molded article, the density is preferably 900 kg/m$^3$ or more. On the other hand, in light of enhancing the miscibility with the component (A), it is preferably 920 kg/m$^3$ or less, more preferably 915 kg/m$^3$ or less. By enhancing the miscibility of the components (A) and (B), a cross-linked foamed molded article, which has few cracks and few coarse cells, can be obtained. The density is determined in accordance with the immersion method described in JIS K7112-1980, after annealing described in JIS K6760-1995.

The intrinsic viscosity ([η]; in dL/g) of the ethylene-α-olefin copolymer of the component (B) in a tetralin solution is 4 to 15 g/10 min. In light of enhancing the fatigue resistance of a cross-linked foamed molded article to be obtained, the [η] is preferably 5 dL/g or more, and more preferably 6 dL/g or more. In light of enhancing the miscibility of the components (A) and (B) and obtaining a cross-linked foamed molded article having good appearance, it is preferably 13 dL/g or less, and more preferably 11 dL/g or less. The [η] is determined by preparing a tetralin solution resulting from dissolving 2,6-di-t-butyl-p-cresol (BHT) in a concentration of 0.5 g/L (hereinafter referred to as a "blank solution") and a solution resulting from dissolving a polymer in the blank solution such that the concentration of the polymer becomes 1 mg/ml (hereinafter referred to as a "sample solution"), and measuring the fall times of the blank solution and the sample solution at 135° C. using an Ubbelohde-type viscometer, followed by a calculation using the following formula:

[η]=23.3×log(ηrel)

ηrel="the fall time of the sample solution"/"the fall time of the blank solution"

Since the ethylene-α-olefin copolymer of the component (B) has a linear structure, the activation energy of flow [$E_a$; in kJ/mol] of the component (B) is less than 50 kJ/mol. The $E_a$ is preferably 40 kJ/mol or less, and more preferably 35 kJ/mol or less.

The activation energy of flow ($E_a$) is a value calculated by an Arrhenius-type equation from a shift factor ($a_T$) in producing a master curve showing the dependency of the melt complex viscosity (in Pa·sec.) on the angular frequency (in rad/sec.) at 190° C. based on the temperature-time superposition principle, and it is a value that can be determined by the following method. That is, melt complex viscosity-angular frequency curves of an ethylene-α-olefin copolymer are obtained for four temperatures including 190° C. selected from among the temperatures of 130° C., 150° C., 170° C., 190° C. and 210° C.; and a shift factor ($a_T$) at each temperature (T, in ° C.) is determined, which is obtained in superposing the melt complex viscosity-angular frequency curve of the ethylene-α-olefin copolymer at each temperature (T) on the melt complex viscosity-angular frequency curve of the ethylene-α-olefin copolymer at 190° C. on the basis of the temperature-time superposition principle; and then a linear approximate equation (the following formula (I)) of [ln($a_T$)] and [1/(T+273.16)] is calculated according to the least squares method from the temperatures (T) and the shift factors ($a_T$) at the respective temperatures (T):

$$\ln(a_T)=m(1/(T+273.16))+n \qquad (I)$$

$$E_a=|0.008314\times m| \qquad (II)$$

wherein $a_T$: shift factor,
$E_a$: activation energy of flow (in kJ/mol),
T: temperature (in ° C.)

For the above-mentioned calculation, commercially available calculation software may be used, and one example of such calculation software is Rhios V.4.4.4 made by Rheometrics Co., Ltd.

The shift factor ($a_T$) is a shift amount when a melt complex viscosity-angular frequency log-log curve at each temperature (T) is shifted in the axial direction of "log (Y)=−log (X)", provided that the Y-axis indicates melt complex viscosity and the X-axis indicates angular frequency, and then it is superposed on the melt complex viscosity-angular frequency curve at 190° C., wherein in the superposition, the melt complex viscosity-angular frequency log-log curve at each temperature (T) is shifted by $a_T$ times in angular frequency and by 1/$a_T$ times in melt complex viscosity.

The coefficient of correlation to be used when the linear approximate equation (I), which is to be obtained from the shift factors at four temperatures including 190° C. selected from among 130° C., 150° C., 170° C., 190° C. and 210° C., and the temperatures, is calculated according to the least squares method is generally 0.99 or more.

The measurement of the melt complex viscosity—angular frequency curve mentioned above is carried out using a viscoelasticity measuring instrument (for example, Rheometrics Mechanical Spectrometer RMS-800 made by Rheometrics Co., Ltd.) usually under conditions including geometry: parallel plate, a plate diameter of 25 mm, a plate spacing of 1.2 to 2 mm, a strain of 5%, and an angular frequency of 0.1 to 100 rad/sec. The measuring is carried out in a nitrogen atmosphere, and it is preferred to previously blend an antioxidant in a measurement sample in an adequate dose (for example, 1000 ppm).

The ethylene-α-olefin copolymer of the component (B) is produced by copolymerizing ethylene and an α-olefin by a known polymerization method, such as a liquid-phase polymerization method, a slurry polymerization method, a gas-phase polymerization method, and a high-pressure ionic polymerization method, using a known olefin polymerization catalyst, such as a Ziegler type catalyst, and a metallocene type catalyst (preferably, a catalyst using a metallocene complex having a ligand in which a (substituted) cyclopentadienyl group and a (substituted) fluorenyl group are linked by a bridging group, such as an alkylene group and a silylene group). These polymerization methods may be any one of a batch polymerization method and a continuous polymerization method. Commercially available products may be used.

The resin composition for cross-linking foam molding of the present invention is characterized in that it comprises a polymer composition comprising the component (A) and the component (B), a foaming agent, and a cross-linking agent. The polymer composition of the present invention comprises 100 parts by weight of the component (A), and 0.5 to 20 parts by weight of the component (B) per 100 parts by weight of the component (A). The content of the component (B) in the polymer composition is preferably 1 part by weight or more, more preferably 2 parts by weight or more per 100 parts by weight of the component (A) in light of enhancing the fatigue resistance of a resultant cross-linked foamed molded article. In light of the miscibility with the component (A), the content of the component (B) is preferably 15 parts by weight or less, more preferably 10 parts by weight or less per 100 parts by weight of the component (A).

As the polymer composition comprising the component (A) and the component (B), there is used a composition prepared by combining them before mixing with the foaming agent and the cross-linking agent. Examples of the method for producing the polymer composition of the present invention include a method in which the components (A) and (B) are produced separately and then mixed; and a method in which a composition comprising the components (A) and (B) is produced by a polymerization reaction.

Examples of the method of mixing the component (A) and the component (B) after producing them separately include a method in which the components (A) and (B) are subjected to melt kneading treatment using an extruder, such as (1) an extruder equipped with an extensional flow kneading die (for example, a die described in U.S. Pat. No. 5,451,106, developed by Utracki, et al.) and (2) an extruder equipped with a counter-rotating twin-screw extruder and a gear pump (preferably, having a reservoir portion between the screw portion and the die); and a method in which solutions prepared by separately dissolving the components (A) and (B) in a solvent such as ortho-dichlorobenzene and xylene on heating are mixed together and then a precipitate is formed using a poor solvent, such as ethanol, and then a mixture is collected.

Examples of the method for producing a polymer composition comprising the component (A) and the component (B) by polymerization include a method in which polymerization is carried out using two olefin polymerization catalysts, for example, a method in which polymerization is carried out by combining a Ziegler type catalyst and a metallocene type catalyst, and a method in which polymerization is carried out using two metallocene complexes. Moreover, there can be mentioned a method in which, for example, the component (B) is produced in a previous stage while the component (A) is produced in a subsequent stage by a multistage polymerization method.

The foaming agent that can be used in the present invention may be a thermally decomposable foaming agent having a decomposition temperature that is equal to or higher than the melting temperature of the polymer composition. Examples thereof include azodicarbonamide, barium azodicarbonate, azobisbutyronitrile, nitroguanidine, N,N-dinitrosopentamethylenetetramine, N,N'-dimethyl-N,N'-dinitrosoterephthalamide, p-toluenesulfonylhydrazide, p,p'-oxybis(benzenesulfonylhydrazide)azobisisobutyronitrile, p,p'-oxybisbenzenesulfonylsemicarbazide, 5-phenyltetrazole, trihydrazinotriazine, and hydrazodicarbonamide, which are used singly or two or more of which are used in combination. Among them, azodicarbonamide or sodium hydrogen carbonate is preferred. The compounding ratio of the foaming agent is usually 1 to 50 parts by weight, and preferably 1 to 15 parts by weight provided that the whole amount of the polymer composition is 100 parts by weight.

In the resin composition for cross-linking foam molding of the present invention can be compounded a foaming aid, if necessary. Examples of the foaming aid include compounds containing urea as a primary ingredient; metal oxides, such as zinc oxide and lead oxide; higher fatty acids, such as salicylic acid and stearic acid; and metal compounds of the higher fatty acids. The used amount of the foaming aid is preferably 0.1 to 30% by weight, and more preferably 1 to 20% by weight, provided that the sum total of the foaming agent and the foaming aid is 100% by weight.

As the cross-linking agent to be used in the present invention can suitably be used an organic peroxide having a decomposition temperature that is equal to or higher than the flow starting temperature of said polymer composition, and examples thereof include dicumyl peroxide, 1,1-ditertiarybutylperoxy-3,3,5-trimethylcyclohexane, 2,5-dimethyl-2,5-ditertiarybutylperoxyhexane, 2,5-dimethyl-2,5-ditertiarybutylperoxyhexyne, α,α-ditertiarybutylperoxyisopropylbenzene, tertiarybutylperoxyketone, and tertiarybutylperoxybenzoate. The compounding ratio of the cross-linking agent is usually 0.02 to 3 parts by weight, and preferably 0.05 to 1.5 parts by weight, provided that the sum total of the polymer composition is 100 parts by weight.

The resin composition for cross-linking foam molding of the present invention may contain various additives, such as a heat stabilizer, a weathering agent, a lubricant, an antistatic agent, a filler, and a pigment (for example, metal oxides, such as zinc oxide, titanium oxide, calcium oxide, magnesium oxide, and silicon oxide; carbonates, such as magnesium carbonate and calcium carbonate; fibrous materials, such as pulp), and also may contain a resin or rubber component, such as ethylene-unsaturated ester copolymers, high-density polyethylene, polypropylene, and polybutene. In particular, when the cross-linked foamed molded article of the present invention or the compressed cross-linked foamed molded article described below is used as a shoe sole or a sole member, it is preferred to contain an ethylene-unsaturated ester copolymer, such as an ethylene-vinyl acetate copolymer, because the adhesion to another member, such as rubber or vinyl chloride sheet, is often necessary. When the resin composition for cross-linking foam molding of the present invention contains an ethylene-unsaturated ester copolymer, the content thereof is preferably 25 to 900 parts by weight, and more preferably 40 to 400 parts by weight relative to 100 parts by weight of the polymer composition, provided that the sum total of the components (A) and (B), that is, the polymer composition is 100 parts by weight.

The resin composition for cross-linking foam molding of the present invention is suitably used for the production of a cross-linked foamed molded article. Examples of the method for producing a cross-linked foamed molded article using the resin composition for cross-linking foam molding include: a method in which a resin composition for cross-linking foam molding obtained by melt-mixing the above-mentioned polymer composition, a cross-linking agent and a foaming agent at a temperature at which neither the foaming agent nor the cross-linking agent decomposes by using a mixing roll, a kneader, an extruder, or the like is filled into a mold by using an injection machine or the like, and it is foamed in a pressurized (pressure keeping) and heated state, and then cooled, followed by taking a cross-linked foamed molded article out; and a method wherein the resin composition for cross-linking foam molding produced by melt-mixing is introduced into a mold, it is foamed in a pressurized (pressure keeping) and heated state using a pressing machine, and then cooled, followed by taking a cross-linked foamed molded article out.

A cross-linked foamed molded article can be obtained by filling the resin composition for cross-linking foam molding of the present invention into a mold and then cross-linking and foaming it by heating it at a temperature that is equal to or higher than the decomposition temperature of the foaming agent and equal to or higher than the decomposition temperature of the cross-linking agent while pressing it at a pressure of 50 kg/cm$^2$ or more.

The clamping pressure of the mold is preferably 50 to 300 kgf/cm$^2$, and the pressure keeping time is preferably approximately from 10 to 60 minutes.

The cross-linked foamed molded article obtained according to the above-mentioned method may be further subjected to compression molding to form a compressed cross-linked foamed molded article. The above-mentioned compression molding is usually carried out under the conditions of applying a load of 30 to 200 kg/cm$^2$ at 130 to 200° C. for 5 to 60 minutes. For a midsole, which is a kind of footwear member, the compressed cross-linked foamed molded article of the present invention is more suitable.

The cross-linked foamed molded article and the compressed cross-linked foamed molded article of the present invention can be cut out into a desired shape for use, or can be processed with buff for use.

The cross-linked foamed molded article or compressed cross-linked foamed molded article of the present invention may be laminated with other layers to form a multilayered laminate. A material constituting the other layers can include a vinyl-chloride resin material, a styrene type copolymer rubber material, an olefin type copolymer rubber material (such as ethylene type copolymer rubber material, and a propylene type copolymer rubber material), a natural leather material, an artificial leather material, a cloth material, and the like. These materials are used as an at least one material.

A method for producing the multilayered laminate includes, for example, a method in which the cross-linked foamed molded article or compressed cross-linked foamed molded article of the present invention and other layer(s) separately formed are laminated using a thermal lamination or a lamination with a chemical adhesive, and the like. The chemical adhesive used include known ones. Among them, particularly an urethane type chemical adhesive, a chloroprene type chemical adhesive, or the like are preferred. In lamination with such a chemical adhesive, an anchor coat, which is called a primer, can be applied in advance.

The cross-linked foamed molded article and compressed cross-linked foamed molded article of the present invention show superior fatigue resistance. Therefore, the cross-linked foamed molded article and compressed cross-linked foamed molded article of the present invention can be suitably used in the form of single layer or multi layer as a member for a footwear such as a shoe, a sandal. The footwear member can include midsole, outer sole, and inner sole etc. Furthermore, the cross-linked foamed molded article and compressed cross-linked foamed molded article of the present invention are used for a building material such as a heat insulating material or a cushioning material, other than the footwear member.

EXAMPLES

The present invention will be described in more detail below by way of examples and comparative examples.

(1) Melt flow rate (MFR, in g/10 min.)

Measurement was carried out by A-method under the conditions of a temperature of 190° C. and a load of 21.18 N in accordance with JIS K7210-1995.

(2) Density (in kg/m$^3$)

Measurement was determined according to carried out by the immersion method described in JIS K7112-1980 after doing annealing described in JIS K6760-1995.

(3) Activation energy of flow ($E_a$, in kJ/mol)

Dynamic viscosity-angular frequency curves at temperatures of 130° C., 150° C., 170° C. and 190° C. were measured using a viscoelasticity measuring instrument (Rheometrics Mechanical Spectrometer RMS-800 made by Rheometrics Co., Ltd.) under the following measurement conditions, and then an activation energy ($E_a$) was determined from the resultant dynamic viscosity-angular frequency curves using calculation software "Rhios V.4.4.4" made by Rheometrics Co., Ltd.

<Measurement Conditions>
  Geometry: parallel plate,
  Plate diameter: 25 mm,
  Plate spacing: 1.5 to 2 mm,
  Strain: 5%,
  Angular frequency: 0.1 to 100 rad/sec., and
  Measuring atmosphere: under nitrogen (4) Molecular weight distribution ($M_w/M_n$)

Using gel permeation chromatography (GPC), a weight-average molecular weight ($M_w$) and a number-average molecular weight ($M_n$) were measured under the following conditions (1) to (8) to determine a molecular weight distribution ($M_w/M_n$), wherein a base line on a chromatogram was a straight line produced by connecting a point in a stable and level area in which the holding time was sufficiently shorter than the appearance time of the elution peak of a sample and a point in a stable and level area in which the holding time was sufficiently longer than the observation time of the elution peak of the solvent.

(1) Device: Waters 150C made by Waters Co., LTD.,
(2) Separating column: TOSOH TSKgelGMH6-HT,
(3) Measuring temperature: 140° C.
(4) Carrier: ortho-dichlorobenzene,
(5) Flow rate: 1.0 mL/min.,
(6) Injection rate: 500 μL
(7) Detector: Differential refractometry
(8) Molecular-weight standard reference material: standard polystylene A tetralin solution in which 2,6-di-t-butyl-p-cresol (BHT) was dissolved in a concentration of 0.5 g/L (hereinafter referred to as a "blank solution"), and a solution in which a polymer was dissolved in the blank solution such that a concentration of the polymer became 1 mg/mL (hereinafter referred to as a "sample solution") were prepared. Using an Ubbelohde-type viscometer, the fall times of the blank solution and the sample solution at 135° C. were measured. An intrinsic viscosity [η] was determined from the falling times by the following formula:

$$[\eta] = 23.3 \times \log(\eta rel)$$

ηrel="the fall time of the sample solution"/"the fall time of the blank solution"

(6) Specific gravity of a cross-linked foamed molded article (in kg/m³)

Measurement was carried out in accordance with ASTM-D297. The smaller this value is, the better the lightweight property is.

(7) Hardness of a cross-linked foamed molded article (dimensionless)

Measurement was carried out using a C-method hardness meter in accordance with ASTM-D2240 for the surface of a resultant cross-linked foamed molded article (a surface placed on a mold).

(8) Compression set of a cross-linked foamed article (in %)

A resultant cross-linked foamed article was sliced into a thickness of 1 cm, and then a sample of 2.5 cm×2.5 cm×1.0 cm was obtained. The sample was compressed from 1.0 cm to 5 mm in thickness and was left at rest in an oven controlled at 50° C. for 6 hours with its compressed state maintained. After a lapse of a prescribed time, it was subjected to the removal of pressure and then it was left at rest at room temperature for 22 hours. Thereafter a thickness "t" [mm] was measured, and then a compression set was determined according to the following formula. The measurement was carried out using four specimens, and the average value was supposed to be a measured value. The smaller this value is, the better the fatigue resistance is.

$$\text{Compression set}(\%) = \{(10-t)/(10-5)\} \times 100$$

Example 1

(1) Preparation of Polymer (A1)
(1-1) Preparation of Co-catalyst Carrier

A nitrogen-purged reactor equipped with a stirring machine was charged with 0.36 kg of silica (Sylopo1948 made by Davison Co., LTD.; 50%-volume average particle diameter=59 μm; pore volume=1.68 ml/g; specific surface area=313 m²/g) heat-treated at a 300° C. under a nitrogen flow and 3.5 liters of toluene, which then stirred. Subsequently, after cooling to 5° C., a mixed solution of 0.15 liters of 1,1,1,3,3,3-hexamethyldisilazane and 0.2 liters of toluene was dropped over 30 minutes with the internal temperature of the reactor maintained at 5° C. After the end of the dropping, stirring was done at 5° C. for one hour, and the temperature was then raised to 95° C., and stirring was then done at 95° C. for 3 hours, followed by filtration. The resultant solid component was rinsed with 2 liters of toluene 6 times. Thereafter, 2 liters of toluene was added thereto to form slurry, which was left at rest overnight.

Into the resulting slurry was charged 0.27 liter of a diethyl zinc solution in hexane (concentration of diethyl zinc: 2 mol/l), followed by stirring. Subsequently, after cooling to 5° C., a mixed solution of 0.05 kg of pentafluorophenol and 0.09 liter of toluene was dropped over 60 minutes with the internal temperature of the reactor maintained at 5° C. After the end of the dropping, stirring was done at 5° C. for one hour, and the temperature was then raised to 40° C., and stirring was then done at 40° C. for one hour. Subsequently, after cooling to 5° C., 7 g of H₂O was dropped over 1.5 hours with the internal temperature of the reactor maintained at 5° C. After the end of the dropping, stirring was done at 5° C. for 1.5 hours, and the temperature was then raised to 55° C., and stirring was then done at 55° C. for 2 hours. Subsequently, after cooling to room temperature, 0.63 liter of a diethyl zinc solution in hexane (the concentration of diethyl zinc: 2 mol/l) was charged. After cooling to 5° C., a mixed solution of 94 g of 3,4,5-trifluorophenol and 0.2 liter of toluene was dropped over 60 minutes with the internal temperature of the reactor maintained at 5° C. After the end of the dropping, stirring was done at 5° C. for one hour, and the temperature was then raised to 40° C., and stirring was then done at 40° C. for one hour. Subsequently, after cooling to 5° C., 17 g of H₂O was dropped over 1.5 hours with the internal temperature of the reactor maintained at 5° C. After the end of the dropping, stirring was done at 5° C. for 1.5 hours, and the temperature was then raised to 40° C., and stirring was then done at 40° C. for 2 hours, the temperature was further raised to 80° C. and stirring was done at 80° C. for 2 hours. Subsequently, the resultant was left at rest to precipitate a solid component, and when an interface between the layer of the precipitate solid component and the slurry portion of the upper layer was observed, the slurry portion of the upper layer was removed, and the remaining liquid component was removed through a filter, and thereafter 3 liters of toluene was added stirring was done at 95° C. for two hours. The resultant was left at rest to precipitate a solid component, and when an interface between the layer of the precipitate solid component and the slurry portion of the upper layer was observed, the slurry portion of the upper layer was removed. Subsequently, the resultant solid component was rinsed with 3 liters of toluene 4 times at 95° C. and with 3 liters of hexane 2 times at room temperature, and then a solvent was added thereto and stirred. Subsequently, the resultant was left at rest to precipitate a solid component, and when an interface between the layer of the precipitate solid component and the slurry portion of the upper layer was observed, the slurry portion of the upper layer was removed. Then, the remaining liquid component was removed through a filter. Subsequently, the resultant was dried at room temperature under reduced pressure for one hour, affording a solid component (hereinafter referred to as a "co-catalyst carrier (a)").

(1-2) Preparation of Preliminarily Polymerized Catalyst Component (1)

A nitrogen-purged, 210-liter autoclave equipped with a stiffing machine was charged with 80 liters of butane, and then 101 mmol of racemic-ethylenebis(1-indenyl)zirconium-diphenoxide was charged, and the autoclave was heated up to 50° C., followed by stirring for two hours. Then, the autoclave was cooled down to 30° C. to stabilize the system. Subsequently, ethylene was charged in an amount corresponding to 0.03 MPa of a gas phase pressure within the autoclave, and 0.7 kg of the above-mentioned co-catalyst (a) was charged, and then 158 mmol of triisobutylaluminum was charged to initiate polymerization. After 30 minutes had passed while ethylene was fed continuously at 0.7 kg/Hr, the temperature was raised to 50° C. and ethylene and hydrogen were fed continuously at 3.5 kg/Hr and 5.5 liters (volume at normal temperature and normal pressures)/Hr, respectively, and thus preliminary polymerization was carried out for 4 hours in total. After the end of the polymerization, ethylene, butane, hydrogen gases and the like were purged, followed by vacuum drying of the residual solid at room temperature, whereby a preliminarily polymerized catalyst component (1) in which 15 g of ethylene per 1 g of the above-mentioned co-catalyst carrier (a) had been preliminarily polymerized was obtained.

(1-3) Preparation of an Ethylene-α-olefin Copolymer

Using the preliminarily polymerized catalyst component (1) obtained as described above, the copolymerization of ethylene and 1-hexene was carried out in a continuous fluidized bed vapor phase polymerization apparatus to obtain a polymer powder. The polymerization conditions were a polymerization temperature of 75° C., a polymerization pressure of 2 MPa, a molar ratio of hydrogen to ethylene of 1.6%, and a molar ratio of 1-hexene to the total of ethylene and 1-hexene of 1.5%. In order to keep gas composition constant, ethylene, 1-hexene and hydrogen were continuously supplied. Furthermore, the above-mentioned preliminarily polymerized catalyst component and triisobutylaluminum were continuously supplied, so that the whole powder weight of 80 kg on the fluidized bed was kept constant. The average polymerization time was 4 hours. The resultant polymer powder was pelletized using an extruder (LCM50 made by Kobe Steel, Ltd.) under the conditions of a feeding rate of 50 kg/hr., a screw rotation speed of 450 rpm, a degree of gate opening of 50%, a suction pressure of 0.1 MPa, and a resin temperature of 200 to 230° C., whereby an ethylene-1-hexene copolymer (hereinafter, referred to as "polymer (A1)") was obtained. The result of physical property evaluation of the resultant polymer (A1) is shown in Table 1.

(2) Preparation of Polymer (B1)

To a nitrogen-purged 200-L reactor equipped with a stirring machine and a baffle were charged 80 L of hexane, 20.6 kg of tetraethoxysilane, and 2.2 kg of tetrabutoxytitanium, which were then stirred Subsequently, 50 L of a solution of butylmagnesium chloride in dibutylether (the solution had a concentration of 2.1 mol/L) was dropped to the stirred mixture over 4 hours with the reactor temperature maintained to 5° C. After the end of the dropping, stirring was done at 5° C. for one hour, and further at 20° C. for one hour, followed by the filtration, whereby a solid component was obtained. Then, the resultant solid component was rinsed with 70 L of toluene three times, followed by the addition of 63 L of toluene to the solid component to form slurry.

A reactor having an internal volume of 210 L, equipped with a stirring machine was purged with nitrogen, and the toluene slurry of the solid component, was charged into the reactor, and 14.4 kg of tetrachlorosilane, 9.5 kg of di(2-ethylhexyl) phthalate were charged therein, followed by stirring at 105° C. for 2 hours. Then, the resultant was subjected to solid-liquid separation, and the resultant solid was rinsed with 90 L of toluene at 95° C. three times. To the solid was added 63 L of toluene, the temperature was raised to 70° C., and 13.0 kg of $TiCl_4$ was charged therein, followed by stirring at 105° C. for two hours. Then, the resultant was subjected to solid-liquid separation, and the resultant solid was rinsed with 90 L of toluene at 95° C. six times, and further rinsed with 90 L of hexane at room temperature two times. After the rinsing, the solid was dried to obtain a solid catalyst component.

An autoclave having an internal volume of 3 L, equipped with a stirring machine was sufficiently dried and vacuumized, and 500 g of butane and 250 g of 1-butene were charged therein, and then the temperature was raised to 70° C. Then, ethylene was added thereto so that the partial pressure thereof might become 1.0 MPa. Polymerization was initiated by charging 5.7 mmol of triethylaluminum and 10.7 g of a solid catalyst component by means of argon. Ethylene was continuously supplied so that the pressure might be maintained constant, polymerization was carried out at 70° C. for 180 minutes. The polymerization provided an ethylene-1-buten copolymer (hereinafter referred to as polymer (B1)). The values of the physical properties of the polymer (B1) were shown in Table 1.

(3) Preparation of Polymer Composition (C1)

In xylene of 120° C. were dissolved 97 parts by weight of the polymer (A1), 3 parts by weight of the polymer (B1) (3.1 parts by weight of the polymer (B1) relative to 100 parts by weight of the polymer (A1)), and 1 part by weight of 2,6-di-t-butyl-p-cresol (BHT), followed by stirring for 1.5 hours.

Then, the xylene solution was dropped to methanol, whereby a polymer composition (hereinafter referred to as C1) was obtained by reprecipitation.

(4) Foam Molding

Sixty parts by weight of the polymer composition (C1), 40 parts by weight of an ethylene-vinyl acetate copolymer (COSMOTHENE H2181 made by The Polyolefin Company Pte. Ltd.) [MFR=2 g/10 min., density=940 kg/m³, and the amount of vinyl acetate unit=18% by weight]; hereinafter referred to as EVA (1)) (66.6 parts by weight of EVA (1) relative to 100 parts by weight of the polymer composition (C1)), 10 parts by weight relative to 100 parts by weight of the total amount of the above-mentioned polymer composition (C1) and EVA (1) (16.7 parts relative to 100 parts by weight of C1) of heavy calcium carbonate, 1.0 part by weight (1.7 parts relative to 100 parts by weight of C1) of stearic acid, 1.0 part by weight (1.7 parts relative to 100 parts by weight of C1) of zinc oxide, 3.9 parts by weight (6.5 parts relative to 100 parts by weight of C1) of azodicarbonamide (Cellmike CE, which is a chemical foaming agent made by SANKYO Chemical Co., Ltd.), and 0.7 parts by weight (1.2 parts relative to 100 parts by weight of C1) of dicumylperoxide were kneaded using a roll kneader under the conditions of a roll temperature of 120° C., and a kneading time of 5 minutes, whereby a resin composition for cross-linking foam molding was obtained. The resin composition for cross-linking foam molding was filled in a mold of 15 cm×15 cm×2.0 cm, followed by foam molding under the conditions of a temperature of 160° C., a time of 30 minutes, and a pressure of 150 kg/cm², whereby a cross-linked foamed molded article was obtained. The results of the physical property evaluation of the resultant cross-linked foamed molded article are shown in Table 2.

Example 2

(1) Foam Molding

Foam molding was carried out in a similar way to Example 1, except that the amount of the chemical foaming agent was changed to 2.7 parts by weight relative to 100 parts by weight of the total amount of the polymer composition (C1) and EVA (1), whereby a cross-linked foamed molded article was obtained. The results of the physical property evaluation of the resultant cross-linked foamed molded article are shown in Table 2.

Comparative Example 1

(1) Foam Molding

Foam molding was carried out in a similar way to Example 1, except that the polymer (A1) was used in place of the polymer composition (C1), whereby a cross-linked foamed molded article was obtained. The results of the physical property evaluation of the resultant cross-linked foamed molded article are shown in Table 3.

Comparative Example 2

(1) Foam Molding

Foam molding was carried out in a similar way to Example 2, except that the polymer (A1) was used in place of the polymer composition (C1), whereby a cross-linked foamed molded article was obtained. The results of the physical property evaluation of the resultant cross-linked foamed molded article are shown in Table 3.

TABLE 1

| Polymer | Density (kg/m³) | MFR (g/10 min.) | [η] (dL/g) | Molecular weight distribution | $E_a$ (kJ/mol) |
|---|---|---|---|---|---|
| A1 | 913 | 0.49 | 1.1 | 9.6 | 72.8 |
| B1 | 910 | — | 9.1 | 15 | 25 |

TABLE 2

| | | Example 1 | Example 2 |
|---|---|---|---|
| Resin composition | | | |
| Polymer A1 | Parts by weight | 0 | 0 |
| Polymer B1 | Parts by weight | 0 | 0 |
| Polymer composition C1 (A1/B1 = 97/3) | Parts by weight | 60 | 60 |
| EVA 1 | Parts by weight | 40 | 40 |
| Foaming agent | Parts by weight | 3.9 | 2.7 |
| Physical properties of cross-linked foamed article | | | |
| Hardness | [shore C] | 49 | 61 |
| Specific gravity of foam | [kg/m³] | 103 | 137 |
| Compression set | [%] | 44 | 39 |

TABLE 3

| | | Comparative Example 1 | Comparative Example 2 |
|---|---|---|---|
| Resin composition | | | |
| Polymer A1 | Parts by weight | 60 | 60 |
| Polymer B1 | Parts by weight | 0 | 0 |
| Polymer composition C1 (A1/B1 = 97/3) | Parts by weight | 0 | 0 |
| EVA 1 | Parts by weight | 40 | 40 |
| Foaming agent | Parts by weight | 3.9 | 2.7 |
| Physical properties of cross-linked foamed article | | | |
| Hardness | [shore C] | 49 | 60 |
| Specific gravity of foam | [kg/m³] | 101 | 133 |
| Compression set | [%] | 49 | 44 |

INDUSTRIAL APPLICABILITY

The present invention can provide a resin composition for cross-linking foam molding from which a cross-linked foamed molded article superior in fatigue resistance can be obtained; a cross-linked foamed molded article constituted by subjecting the resin composition to foam-molding; a method of producing the cross-linked foamed molded article; a compressed cross-linked foamed molded article resulting from compressing the cross-linked foamed molded article; a footwear member having a layer comprising the cross-linked foamed molded article or the compressed cross-linked foamed molded article; and a footwear comprising the footwear member.

The invention claimed is:

1. A resin composition for cross-linking foam molding comprising:
   a polymer composition which comprises 100 parts by weight of the following component (A) and 0.5 to 20 parts by weight of the following component (B);
   a foaming agent; and
   a cross-linking agent, wherein
   the component (A) is an ethylene-based polymer satisfying the following conditions (a1) to (a2):
   (a1) the density is 860 to 935 kg/m³, and
   (a2) the melt flow rate (MFR) is 0.1 to 10 g/10 minutes, wherein the MFR is determined by the A-method at a temperature of 190° C. and a load of 21.18 N according to JIS K7210-1995, and
   the component (B) is an ethylene-α-olefin copolymer satisfying the following conditions (b1) to (b3):
   (b1) the density is 890 to 925 kg/m³,
   (b2) the intrinsic viscosity [η] determined in a tetralin solution is 4 to 15 dL/g, and
   (b3) the activation energy of flow (Ea) is less than 50 kJ/mol.

2. A method of producing a cross-linked foamed molded article comprising:
   filling the resin composition for cross-linking foam molding according to claim 1 into a mold; and
   heating the resin composition at a temperature which is equal to or higher than the decomposition temperature of the foaming agent and equal to or higher than the decomposition temperature of the cross-linking agent, while pressurizing the resin composition at 50 kg/cm² or more, thereby cross-linking and foaming the resin composition.

3. A cross-linked foamed molded article obtained by the method according to claim 2.

4. A compressed cross-linked foamed molded article obtained by compressing the cross-linked foamed molded article according to claim 3.

5. A footwear member having a layer of the cross-linked foamed molded article according to claim 3.

6. A footwear member having a layer of the compressed cross-linked foamed molded article according to claim 4.

7. A footwear comprising the footwear member according to claim 5.

* * * * *